United States Patent [19]

Tong et al.

[11] Patent Number: 5,359,699

[45] Date of Patent: Oct. 25, 1994

[54] METHOD FOR USING A FEED FORWARD NEURAL NETWORK TO PERFORM CLASSIFICATION WITH HIGHLY BIASED DATA

[75] Inventors: David W. Tong, Scotia; Paul A. Delano, Schenectady, both of N.Y.

[73] Assignee: General Electric Company, Schenectady, N.Y.

[21] Appl. No.: 801,328

[22] Filed: Dec. 2, 1991

[51] Int. Cl.⁵ ............................................. G06F 15/18
[52] U.S. Cl. ...................................... 395/22; 395/23; 382/14
[58] Field of Search ................ 395/23, 21, 22; 382/14

[56] References Cited

PUBLICATIONS

Lippmann, R. P. "An Introduction to Computing with Neural Nets," IEEE ASSP Magazine, Apr. 1987, 4–22.
Goryn et al., "Conjugate Gradient Learning Algorithms for Multilayer Perceptions," Proc. 32nd Midwest Symp. on Circuits and Systems, Aug. 1989, 736–739.
Lippman, R. P., "Pattern Classification Using Neural Networks," IEEE Comm. Magazine, Nov. 1989, 47–64.
Ahmad et al., "Scaling and Generalization in Neural Networks: A Case Study," Advances in Neural Info. Proc. Syst. I, 1989, 160–168.
Hanson et al., "Comparing Biases for Minimal Network Construction with Back-Propagation," Advances in Neural Info. Proc. Syst. I, 1989, 177–185.
Caudill, M., "Using Neural Nets: Diagnostic Expert Nets," AI Expert, Sep. 1990, 43–47.
Guo et al., "Sensor Failure Detection and Recovery by Neural Networks," Intl. Joint Conf. on Neural Networks, Jul. 1991, I–221–I–226.
Zhu et al., "ECG Monitoring with Artificial Neural Networks," 2nd Intl. Conf. on Artificial Neural Networks, Nov. 1991, 205–209.
Jang et al., "Application of Neural Networks for Seismic Phase Identification," 1990 IEEE Intl. Joint Conf. on Neural Networks, Nov. 1991, 899–904.
Sakaue et al., "Reduction of Necessary Precision for the Learning of Pattern Recognition," 1991 IEEE Intl. Joint Conf. on Neural Networks, Nov. 1991, 1795–1800.
Lawrence, J., "Data Preparation for a Neural Network," AI Expert, Nov. 1991, 34–41.
"An Artificial Neural Network to Solve Multidimensional Boundary Determination Problems", A Thesis Submitted to Graduate Faculty of Rensselaer Polytechnic Institute, Rensselaer, N.Y. by Paul A. Delano, pp. 1–69–Dec. 1990.
"Neural Nets for Fault Detection", Submitted to The 2nd Government Neural Network Applications Workshop, Huntsville, Ala. by David W. Tong–pp. 1–4 Sep. 1991.
"Neural Nets for Abnormality Detection" by David W. Tong & Paul A. Delano, General Electric Corporate Research & Development, Schenectady, N.Y.–pp. 1–9, 1991.

*Primary Examiner*—Robert W. Downs
*Attorney, Agent, or Firm*—David C. Goldman; Paul R. Webb, II

[57] ABSTRACT

An artificial neural network detects points in feature space outside of a boundary determined by a set of sample data. The network is trained using pseudo data which compensates for the lack of original data representing "abnormal" or novel combinations of features. The training process is done iteratively using a net bias parameter to close the boundary around the sample data. When the neural net stabilizes, the training process is complete. Pseudo data is chosen using several disclosed methods.

10 Claims, 1 Drawing Sheet

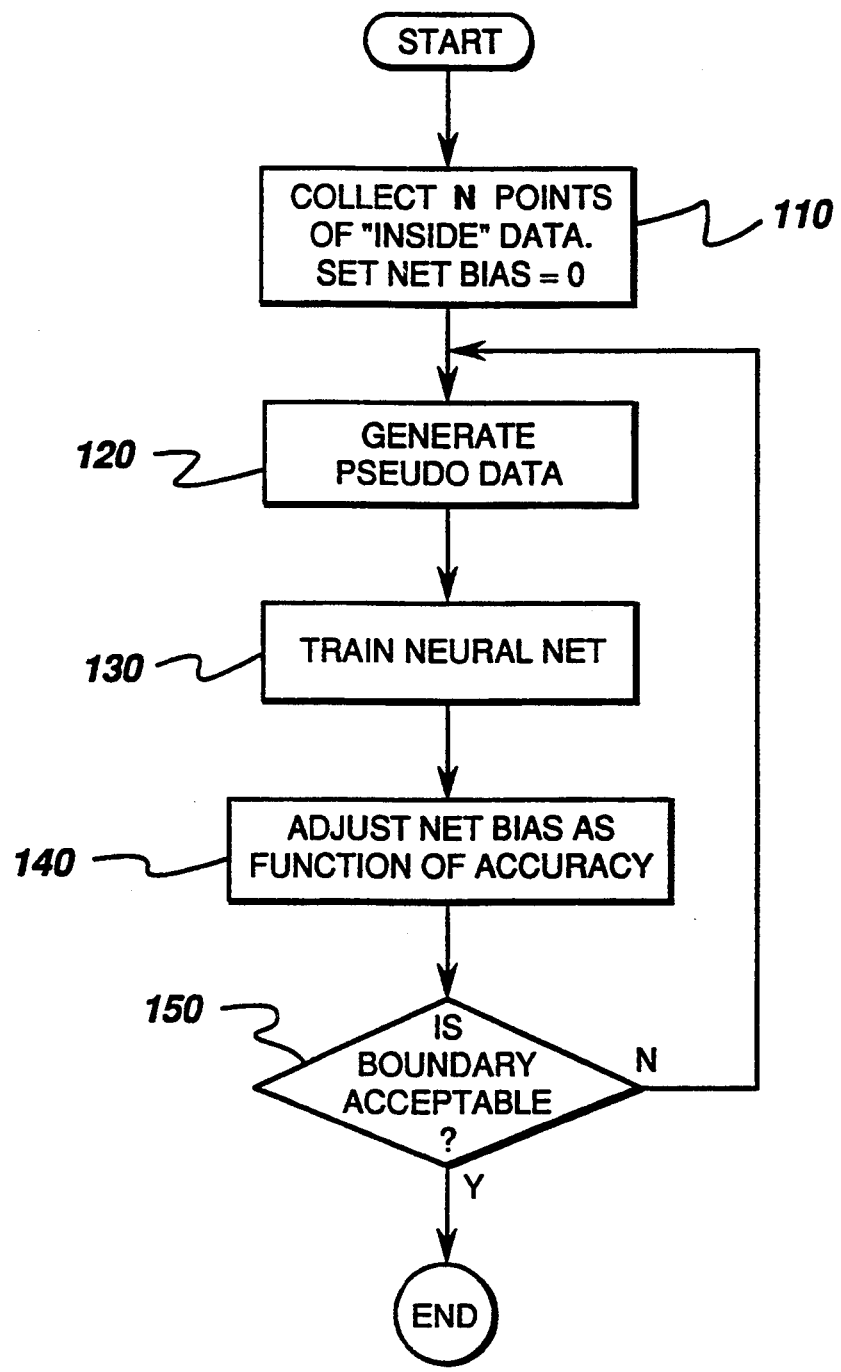

METHOD FOR USING A FEED FORWARD NEURAL NETWORK TO PERFORM CLASSIFICATION WITH HIGHLY BIASED DATA

BACKGROUND

The present invention relates to artificial neural networks and more particularly to a method of training and using the same to perform classification when data is unavailable or scarce for one or more classes to be identified. A neural network consists of many simple, densely interconnected, processing elements (PE) or units. The memory of the network resides not on the individual PE's but on the connections which are weighted. The weight of a connection is analogous to the strength of a synapse between the dendrites of two neurons in the brain. In a three-layer feedforward neural network, the first layer consists of input units where each unit simply receives a single component, i.e., data feature, of the input vector and transmits it to all units in the next layer called the hidden layer. Each unit in the hidden layer receives input from all input units weighed by connection weights, processes this input, and transmits an output to each unit of the output layer, again via weighted connections. The same processing of inputs occurs in the output units, resulting in a final output vector. Typically each neural unit, except the input units, sums the weighted inputs, passes the sum through a sigmoidal function, and outputs the result to the next layer of units.

Neural networks learn by exposure to a set of training examples. During the training phase, the connection weights in the network are adjusted in such a way as to minimize the error in the network output. A popular example of a training algorithm is the Backpropagation algorithm applied to the feed-forward network (see Rumelhart D. E., McClelland, J. L. and the PDP Research Group, "Learning Internal Representations by Error Propagation," *Parallel Distributed Processing*, The MIT Press, Cambridge, MA, 1986). In Backpropagation (BP), the difference between the actual network output and the correct output is used to adjust the weights of the connections to the output layer. The typical way to express the output error is in terms of the mean squared error:

$$E = \frac{1}{n} \sum_{i=1}^{n} (t_i - o_i)^2 \quad (1)$$

where n is the number of output nodes, $t_i$ is the desired (target) value at output node i, and $o_i$ is the actual value at output node i for a given input vector. In turn, the errors in the output layer are "backpropagated" to adjust the connections for the adjacent hidden layer. These adjustments are iterated layer by layer until all connection weights are updated. The training cycle is repeated until the weights stabilize.

In recent years there has been much research focused on the development of automated systems. Many automation problems like pattern recognition, speech recognition, system monitoring, and automated diagnostics require distinctions between different states of the world. This problem of state distinction can often be described as a classification problem. As a result of this need for automated classifiers, many classification methods have been developed, from heuristic rule systems to artificial neural networks to varied statistical methods.

In spite of the common use of classifiers in many automatic decision-making applications, there are some important applications that are not amenable to the standard classifiers, including the standard neural network. Important classes of such applications include novelty, or unanticipated event, detection, and fault detection. An example of the former class is in sonar signal classification, where there is a need to recognize that a signal belongs to a previously unknown, but significant, source. An example of the latter class is sensor-based monitoring where the task is to interpret multiple sensor outputs and determine if the monitored system is operating normally. These classes of applications are characterized by having a wealth of data about some of the permissible classes, e.g., normal operating conditions, and a dearth of data about others, e.g., different faulted states.

Actual examples of sensor-based monitoring applications include jet engines and machine tool monitoring. Jet engines contain a suite of mounted sensors that are used to periodically measure engine parameters. It is a critical but difficult problem to analyze the often voluminous data to detect faults. Since engines rarely fail, the data base contains very few examples of failure data. In engine part machining, machine tools need to be monitored for breakage and the machine stopped to prevent loss of an expensive workpiece. Since standard machining practice is already such as to minimize tool breakage, the collected data represents mostly normal cutting.

In antisubmarine warfare, classification by sonar is a key technique for identifying the presence of enemy ships. Sonar signal patterns are recognized using a database of signals collected from various sources. The database is always incomplete since new signal sources continuously evolve, and the classifier, whether human or machine, is measured by how well it can recognize those signals that are different from any prior known signals.

Credit card fraud costs financial institutions millions of dollars and a significant effort is spent in trying to detect the fraudulent activity. Although some number of fraudulent cases are available for reference, the best criteria for detecting fraud is by detecting significant deviation from normal account activity.

Each of the above cases serves as an example of the class of problems involving detection of abnormal data patterns. Abnormality detection is a subclass of pattern classification problems. The latter are concerned with the determination of which of M classes is representative of an unknown input pattern containing N elements, or features. Thus the input pattern could be the pixels of an image and the output is one of several objects; or the input pattern could contain information on a credit application and the output is the accept or reject decision. For a typical pattern classification problem, data is assumed to exist for each of the output classes, and developing a classifier is to find the optimal class boundaries in the decision space defined by the input features.

The abnormality detection problem would be a standard pattern classification problem if there existed ample examples of each of the abnormalities. However, with most practical detection problems of interest, abnormality examples are scarce or missing altogether. If standard classification techniques are applied to such biased data sets, the classifier will likely make errors in favor of the abundant example class, i.e., it will generalize erroneously. Intuitively, the desired class boundary is one that tightly defines the decision space occupied by the highly represented class. This boundary may have to take on a highly nonlinear shape, perhaps even defining disconnected regions.

There are several traditional (non-neural network) methods for boundary determination. Perhaps the simplest and easiest method is to look at all of the known n-dimensional (for an n-feature problem) data points and to take the maximum and minimum of each feature one at a time. This will determine a hypercube boundary for the data. This is a very fast method for calculating the boundary with much enclosed space near the "corners" of the boundary.

Another very simple but effective method for calculating a boundary is to set a maximum threshold on the distance between a point and the nearest known point. This near neighbor threshold is like the nearest neighbor classification method but a threshold distance is used instead of the minimum distance from one class or the other. The near neighbor method can detect rather complex boundaries and provides a consistent way to calculate whether a point is inside or outside for any number of dimensions. This method tends to be rather slow however, because any new point must be compared with every other point. Also, every known point must be stored. The threshold must also be set to some value, and assumptions are generally made about the properties of the boundary, in order to set that threshold value.

A method similar to the near neighbor method is the potential function method. This method calculates the decaying potential between a test point and all of the other known points in space. If the potential is greater than some potential, the point is classified as inside, otherwise it is outside. This has most of the advantages and disadvantages of the nearest neighbor method. It does provide a slightly different boundary surface however, since it takes into account the density of inside points in space.

In a data-trending approach, heuristic decision rules are established through laborious analysis of the dana. Data is plotted against those features that are suspected of being detection sensitive, and thresholds are found for those features which discriminate between normal and abnormal. The thresholds are usually chosen to maximize the likelihood of detecting abnormality but still yielding an acceptable level of false alarms, i.e., falsely classifying a normal case as abnormal. Often thresholding one feature is insufficiently discriminating and multiple features must be thresholded in a decision tree scheme. Developing such decision criteria can involve weeks of data analysis. Manual generation of such detection algorithms is difficult and is likely to be suboptimal since the developer is unable to thoroughly search for the best feature set.

It would be useful therefore, to extend the current neural network pattern classifier to the domain of highly biased data problems. Such an extension of currently available technology would limit the neural network's generalization power, thereby providing classification according to a decision boundary that tightly bounds, i.e., minimally generalizes from, the highly exemplified class.

Before describing the present inventive method, a brief description of a typical feed forward neural network with which the present invention is practiced, is provided.

SUMMARY OF THE INVENTION

The present invention is a method for using an artificial network to perform classification of multi-dimensional input data when data for a class, which typically represents either an abnormal system state or a novel class of data, is either sparse or non-existent. The method relies on the generation of pseudo data which is meant to replace the lack of data for the "outside" class. The neural network is trained using the available data, belonging to the "inside" class, and pseudo data which is generated in the specific ways disclosed herein. The training is performed iteratively until the neural net performs acceptable classification on both the inside and pseudo data.

In a first embodiment of the present invention, pseudo data is generated randomly within a bounding hypercube large enough to contain all of the given inside data. In this embodiment, a net bias parameter is used to bias the training towards correctly identifying the real inside data. This biasing can be accomplished by decreasing (negatively) the target output node value for the "outside" output node when training with "inside" data.

In another embodiment, the pseudo data, at each training iteration, may include pseudo data from previous training iterations where the retained pseudo data comes from those data points which fall close to the boundary as most recently computed by the neural network.

In a final embodiment, the pseudo data is initially generated randomly on a bounding hypercube surface and thereafter at each training iteration a given point is generated within the same bounding hypercube but only actually used for training if the neural net does not classify it as an "inside" data point. In this mode, the net bias parameter is not necessary because no pseudo data points will occupy the inside data space. Any one of the training methods known in the art including backpropagation may be used with the present invention.

BRIEF DESCRIPTION OF THE DRAWING

FIG. 1 is a flow chart of the present invention.

DETAILED DESCRIPTION

Unlike conventional neural network classifiers that learn to distinguish data of different, but known classes, the neural net training method of the present invention learns to discriminate data of known classes from data that are likely to belong to previously unknown classes. The function that the network of the present invention performs can be described as abnormality or novelty detection, where abnormal or novel events are defined to be unlike those presented to the network during training.

For simplicity, the known data is assumed to belong to a single class although the method is applicable to multiple class data sets also.

A neural network trained according to the present invention determines a decision boundary that closely defines the region occupied by the data points of a known given class. The decision boundary can be set in a controlled way to loosely or tightly bound the given data points. The boundary is typically closed but is not necessarily convex. After having formed such a decision boundary, the network can then be tested with arbitrary input vectors. Those that fall outside the decision boundary are designated by the network as different from the data used for training.

The method uses a feed forward neural network. The network inputs are the elements of the input data vector, or data features, and the node outputs are the output classes. The neural network is trained by backpropagation of output errors or any one of a variety of related optimization methods, e.g., gradient descent or conjugate gradient (see D. G. Luenberger, Linear & Nonlinear Programming, 2nd ed., Addison-Wesley, Reading, Mass. 1984). The present training algorithm makes three additions to the traditional backpropagation training for classification.

The first difference between classification and boundary determination training is that in the latter, one of the classes is artificially generated. Neural network training for classification needs competing classes of input data to make a reasonable decision boundary. However, in abnormality or novelty detection type problems there is often only one class of data, hereafter called the "inside" data. Therefore, a set of "outside" class data is artificially generated to provide a competing influence to the known inside points. These "pseudo" outside data points can be initially chosen so that either they are randomly distributed within a selected region of the decision space, or they can be more specifically located as discussed below.

In order to insure that the neural network classifies all of the known inside points correctly, the training error term is biased to favor the correct classification of inside points. This second difference takes advantage of the fact that the back-propagation training technique attempts to minimize the total error of the system.

The third difference is that the present method allows error parameter adjustment and multiple training cycles. Since the optimal error term bias and best set of pseudo outside points is not known at the beginning of training, the method iterates through the classification and adjustment process until completion. Completion of the method depends on finding a good boundary solution or determining that the net has converged.

As shown in FIG. 1, the method begins at 110 with a neural network in some initial state, a set of input data and a net bias parameter set to zero. The N points of known inside data are exactly the points around which the boundary is to be learned. The net bias parameter is the parameter that determines the training bias for errors in the classification, i.e., an inside point classified as outside, or outside point classified as inside. The bias parameter is set to 0 for the first training iteration so the method begins training with unbiased normal classification.

Next, at 120, pseudo data is generated to represent points different from the inside data. It would be ideal to place the pseudo outside points just outside of the desired boundary. However, that information is not available since that is the problem to be solved. Therefore, pseudo data is chosen so that it overlaps and/or surrounds the inside data. One reasonable choice for the initial pseudo data is to randomly generate them within a bounding hypercube defined so its hypervolume is twice that of the hypercube bounding the inside data.

A random distribution of pseudo data points can occasionally lead to an uneven distribution. In order to provide an average even distribution, the algorithm is repeated multiple times, each time the network is trained to convergence with a new set of pseudo data. This iterative technique reduces irregularities in the boundary due to local concentrations of random data.

Another way to generate an even distribution of pseudo data in a bounding hypercube is to place the points on regular intervals in each dimension. There are two problems with this method however. First, the total number of data points needed to represent the matrix increases exponentially with each additional dimension. Second, the regularity of the grid can force the boundary to have certain undesirable properties such as non-tight boundaries in concave regions and boundaries parallel to grid lines.

A modification of the randomly generated pseudo data allows retention of pseudo data points that appear to be near the boundary. The purpose of this is to push in the boundary closer to the inside points by clustering more outside points near the boundary. A simple method for finding points near the boundary is to calculate a confidence value for each pseudo data point. This confidence value is calculated by subtracting the two network output node values. A small difference denotes a low confidence and a large difference denotes a high confidence of the result. Pseudo data points resulting in low confidence values are estimated to be near the boundary and can be retained for the next training cycle.

Once the inside data is collected and the pseudo data is generated, the data points are presented to the neural network for training at block 130.

The net bias parameter can be used in several different ways. The purpose of the bias parameter is to force the error term to reflect the desired boundary state. The boundary state could be a tight boundary, a relaxed boundary, a boundary containing all inside points, or a boundary containing most of the inside points. The bias parameter can be used in different ways, such as an output error multiplier for one class whereby the error term (as shown in equation (1)) is multiplied by a constant which is a function of the input class, or as an output target value modifier. The simplest and most effective way to modify the error term is to modify the output target values.

A neural network implementation with two output nodes corresponding to two classes provides four target values to be adjusted. These values correspond to the positive and negative target values for each of the two output nodes and for each of the two classes of inputs. For example, during training, when an inside point is presented for classification, the Inside output node is set to a target value of target(I,p), and the Outside output node is set to a target value of target(O,n) (see equation (1)). With no bias term, these values would be 1 and −1 respectively. With a bias term, the output target values are calculated as:

TABLE 1

| Output Target Functions |
| --- |
| target(I,p) = 1 + (positive inside bias) |
| target(I,n) = −1 − (negative inside bias) |
| target(O,p) = 1 + (positive outside bias) |
| target(O,n) = −1 − (negative outside bias) |

Only the negative outside bias term is used in normal boundary training. All of the other bias terms are set to zero to set a reference against the negative outside bias, which the net bias parameter is used for. This bias term is set to positive values to force the network to get perfect accuracy on the inside data set. This works because the outside negative target value contributes more to the error term as it gets larger in absolute value.

The positive outside bias term and the negative inside bias term can be used to push the boundary in or out. These bias terms are used to modify the error generated by the outside data points. The bias values are increased to increase the outside point influence and decreased to decrease the outside point influence on the error term Generally, as the outside point influence increases, the boundary is pushed towards the inside points and as the inside point influence increases, the boundary is pushed towards the outside points.

When the network begins training, all of the target bias parameters are set to zero. As mentioned above, during normal boundary training, the net bias parameter is used to set the negative outside bias value. This value remains zero if the inside accuracy remains perfect. This is not usually the case because the outside data can overlap the inside data.

When the inside data goes below 100% accuracy the net bias parameter is increased as a function of the accuracy. As the accuracy decreases, the net bias change increases. Once the net has reached perfect inside accuracy again, the net bias is reduced a smaller amount. The result of these adjustments is a net bias parameter that gets large in early training iterations and generally converges to a smaller value as the net finds a good boundary in layer iterations.

In order to end the training loop, the trained neural network must pass the exit condition. There are two possible conditions for detecting the end of training, determining an acceptable boundary and detecting when the weights have stabilized.

The method of boundary convergence used in the present invention employs a minimum accuracy criteria. After a net has been trained for a fixed number of cycles to determine a reasonable bias value and outside accuracy, the net is allowed to train until it meets a minimum inside and outside accuracy.

The stability of the neural network could also be used to detect algorithm completion. The neural network tends to stabilize to some degree early in training. However, after an initial reasonable solution has been found, the boundary can change radically without much change in the network weights. Thus, it is very difficult to detect network convergence by just looking at the net weights. This is particularly difficult if the random pseudo data approach is used, since the net is constantly changing to compensate for different outside data sets. After many trials to determine if the weights converged, it was determined that weight convergence was not generally a good measure of training completion.

Referring again to FIG. 1, the boundary learning algorithm would work in the following way on a circular example. A circular region is derived from a random set of points within a circle about the origin of radius equal to 70. If 100 points of that data are taken as the input to the method then N=100. The net bias parameter is set to 0.0 at 110. At 120 the pseudo data bounding hypercube has dimensions of 200 on each side, centered on the origin. The method generates 100 points of pseudo outside data randomly distributed in the range of −100 to 100 in each dimension. The net is trained to convergence on the 200 training points at 130. The net is tested and the inside and outside accuracy values of the trained network are used to determine if the net should be trained again. Assume for example that the outside accuracy was 60% and the inside accuracy was 95%. At 140 the net bias parameter is increased. Since the inside accuracy was not perfect, the test at decision point 150 fails so the algorithm jumps back to block 120 to repeat the cycle. The new training data generated includes the N original inside points and pseudo data points. The M pseudo data points can be generated in the several ways described hereinabove. The cycle continues until all of the inside points are classified correctly, and the outside accuracy is greater than some threshold. The resulting net is saved as the output of the algorithm.

A variation to this approach is to first generate random pseudo points which are located on a bounding hypercube surface which points by definition are outside the region of the inside data points. This bounding hypercube could be defined for example by the extreme (maximum and minimum) values contained in the inside data set. After the first training iteration, a loose boundary will have formed around the inside data points. A new set of pseudo outside points are generated within the bounding hypercube and are classified by the network. Those pseudo points that are classified as inside are discarded, and the rest kept for another training iteration. In this variation, pseudo data points that would have occupied the inside data region are removed, thus reducing the dependence on the net bias parameter. The net bias parameter is not necessary because the net accuracy on the inside points will be 100% if pseudo data in the inside region are removed. Again the procedure is repeated until a convergence criteria is met. The prior set or sets of pseudo data may be retained for training during each iteration.

Another variation to this approach is to generate data on a bounding hypercube volume in a regular matrix to fashion. This ensures an even distribution of pseudo data points, but the number of such points increases very rapidly with the dimension of the input vectors.

Yet another extension of this method is to allow multiple inside classes, in which case the network will have an output node for each inside class plus the one for the outside class. Additional bias parameters can be introduced either as multipliers for the error terms in equation (1), or as additional output target values similar to those listed in Table 1 (target (I, P1), target (0,P1), target (I, P2), etc.).

While the present invention has been described with respect to specific embodiments, many modifications, variations, alterations, substitutions, and equivalents will be apparent to those skilled in the art. Accordingly, the invention is to be considered as limited only by the spirit and scope of the appended claims.

What is claimed is:

1. A method for using an artificial neural network comprising a plurality of weighted interconnected processing elements forming an input layer, an output layer, and a hidden layer connecting the input layer and the output layer, for performing classification of sensor-based data provided to said network wherein the classes to be used include and inside class consisting of one or more classes for which representative sensor-based data is available and an outside class representing an abnormal or novel class for which representative sensor-based data is unavailable or scarce, said method comprising the steps of:

gathering inside data representative of said inside class;

generating pseudo data representative of said outside class;

inputting said inside data and said pseudo data to said artificial neural network;

storing said inputted inside data and said pseudo data in said artificial neural network;

training said artificial neural network to reduce the level of classification error output using said inside data and said pseudo data, said training comprising the step of setting a bias parameter for biasing an output term for identifying said inside data;

repeating said generating, inputting, storing, and training steps until an acceptable class boundary is formed around said inside data by said artificial neural network; and classifying the sensor-based data in accordance with the accepted class boundary.

2. The method of claim 1 wherein said biasing is adjusted during said training as a function of the accuracy of said neural network in classifying said inside data correctly.

3. The method of claim 1 wherein said pseudo data is generated randomly within a bounding hypercube large enough to contain all of said inside data.

4. The method of claim 3 wherein said pseudo data includes pseudo data from previous training iterations, wherein said previously generated pseudo data is close to the boundary as determined by said neural network.

5. The method of claim 1 wherein said pseudo data is initially generated randomly on a bounding hypercube surface, said hypercube bounding said inside data and wherein said pseudo data is thereafter generated after each said repeating step within said bounding hypercube and selected from those of said pseudo data points which are not classified as inside data by said neural network.

6. The method of claim 1 wherein said pseudo data is generated on fixed regular matrix points within a hypercube bounding said inside data.

7. The method of claim 1 wherein said training is performed using backpropagation of errors.

8. The method of claim 1 wherein said training is performed using a gradient descent method.

9. The method of claim 1 wherein said training is performed using a conjugate gradient method.

10. A method for using an artificial neural network comprising a plurality of weighted interconnected processing elements forming an input layer, an output layer, and a hidden layer connecting the input layer and the output layer, for performing classification of sensor-based data provided to said network wherein the classes to be used include a plurality of inside classes for which representative sensor-based data is available and an outside class representing an abnormal or noel class for which representative sensor-based data is unavailable or scarce, said method comprising the steps of:

gathering inside data representative of said plurality of inside classes;

generating pseudo data representative of said outside class;

inputting said inside data and said pseudo data to said artificial neural network;

storing said inputted inside data and said pseudo data in said artificial neural network;

training said neural network to reduce the level of classification error output using said inside data and said pseudo data, said training comprising the step of setting a bias parameter for biasing an output term for identifying said inside data;

repeating said generating, inputting, storing, and training steps until acceptable respective class boundaries are formed around said inside data representative of said plurality of inside classes by said artificial neural network; and classifying the sensor-based data in accordance with the accepted class boundary.

* * * * *